Dec. 26, 1967  J. K. RYE  3,359,613
HYDROSTATIC BEARING AND METHOD OF MAKING SAME
Filed May 27, 1965  4 Sheets-Sheet 1
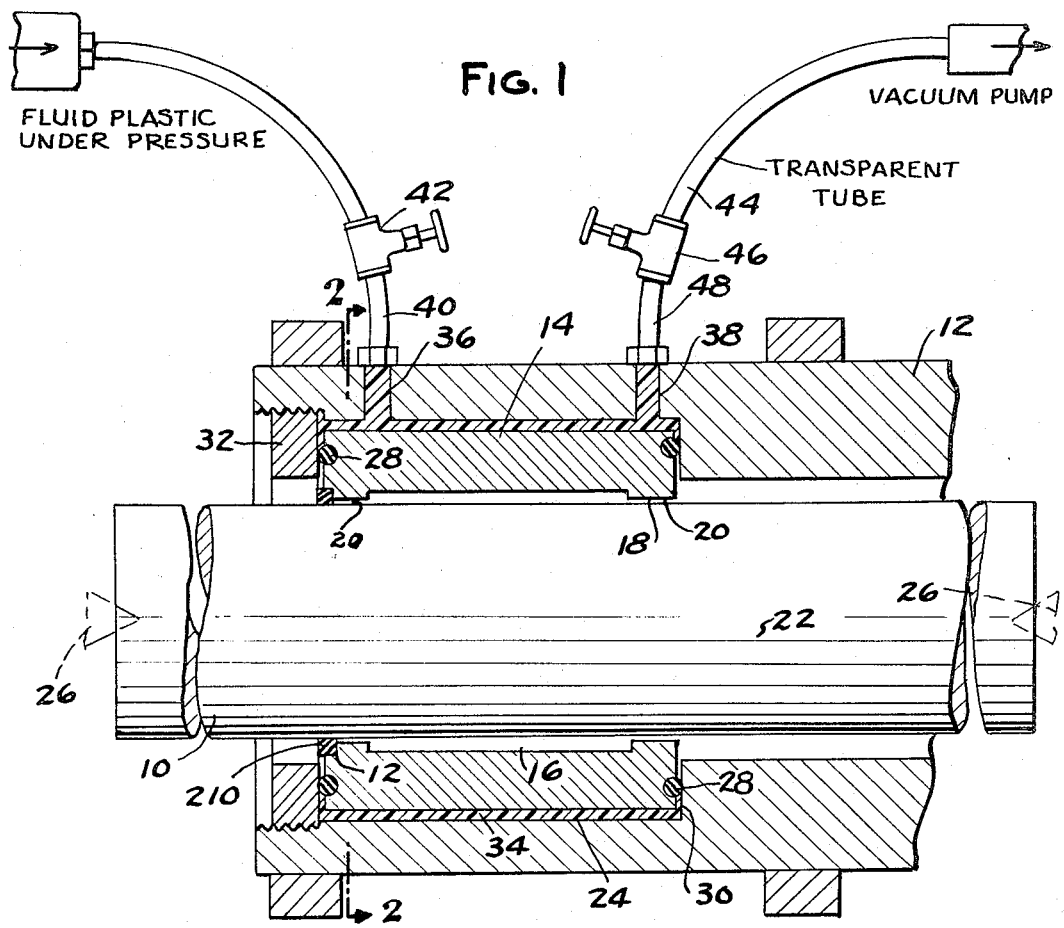
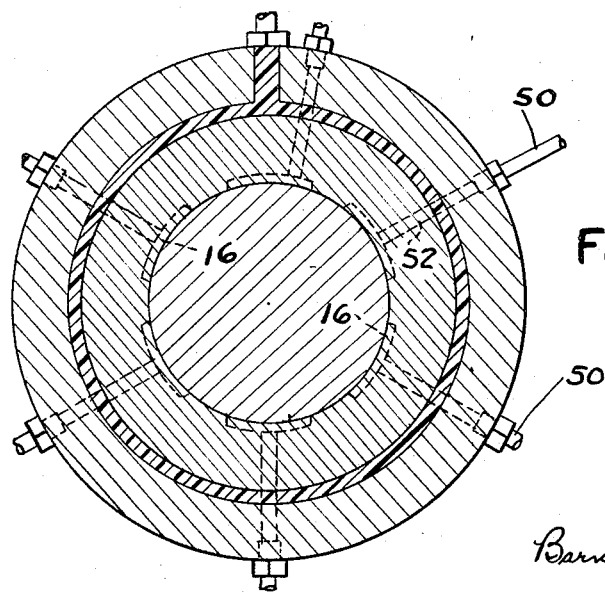
INVENTOR.
JOHN K. RYE
BY
Barnes, Kisselle, Raisch & Choate
ATTORNEYS

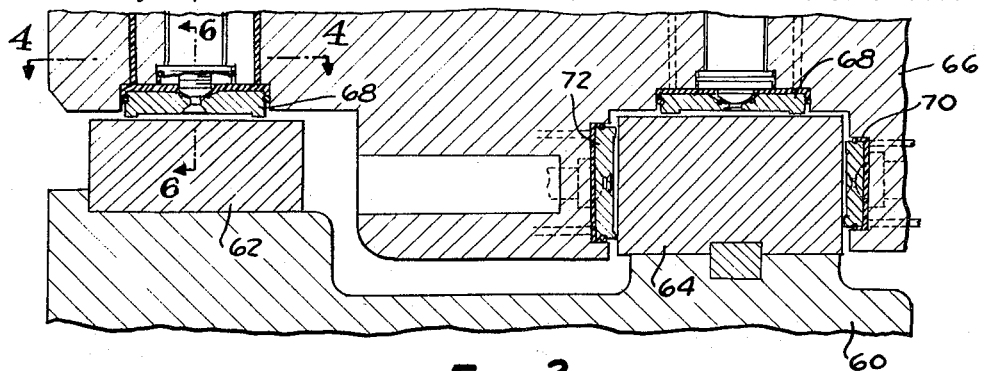
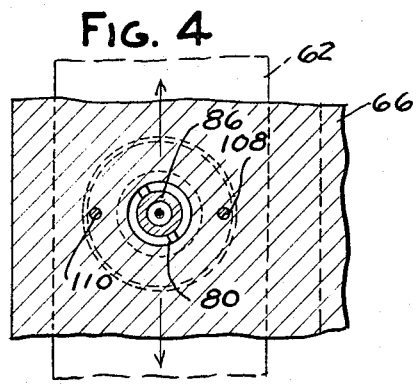
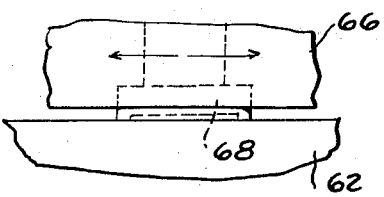
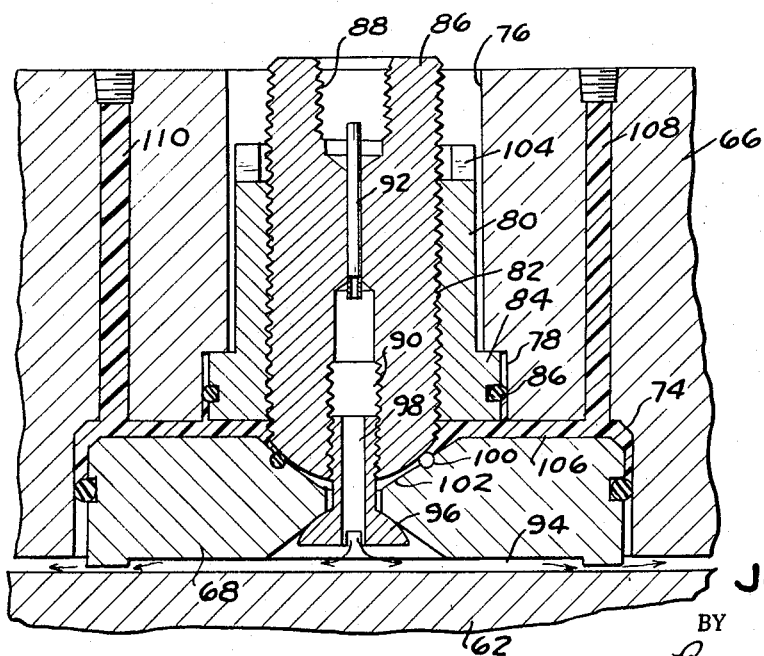

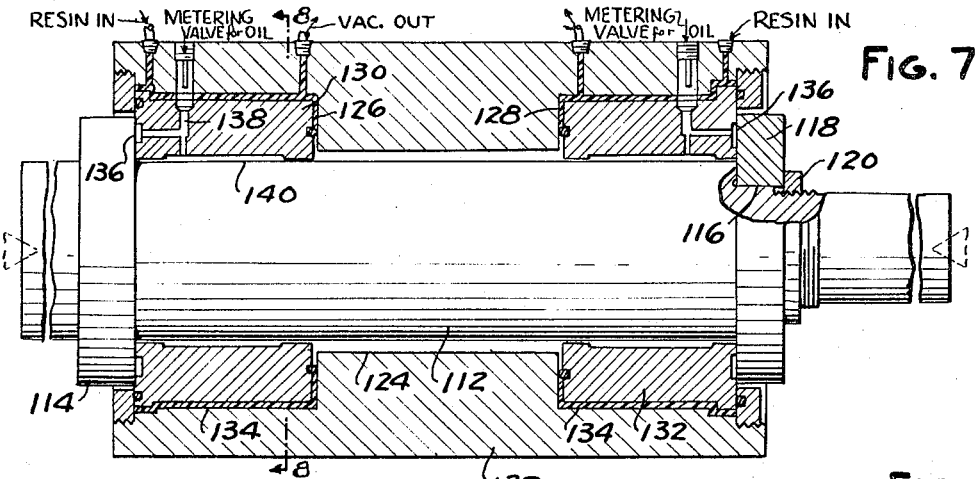
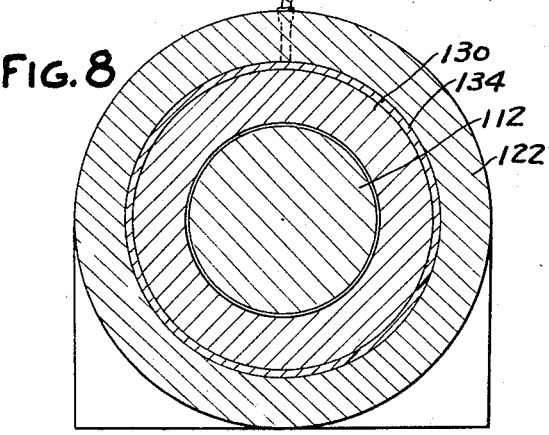
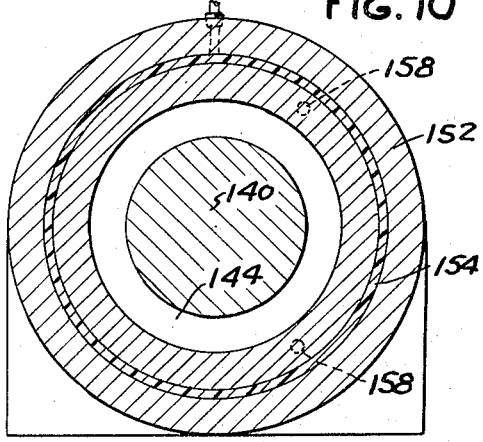
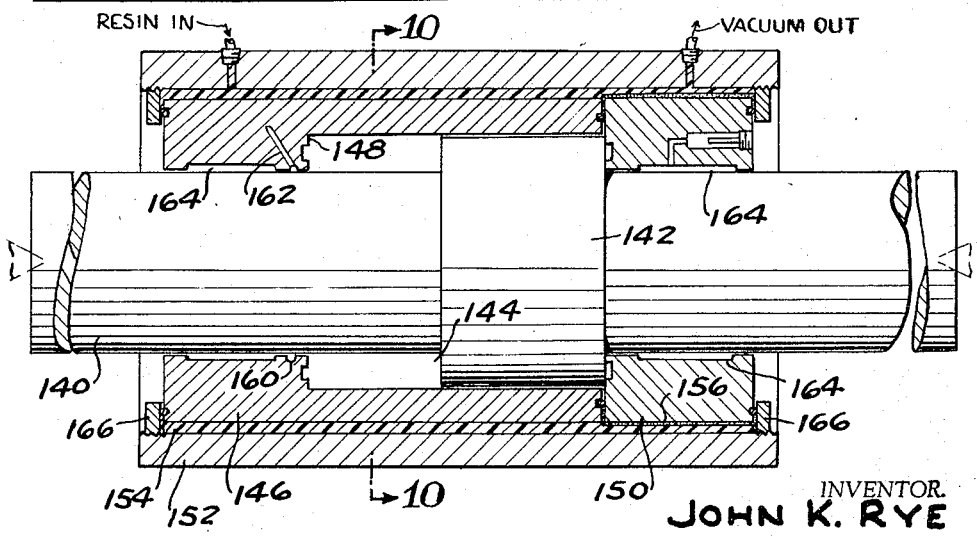

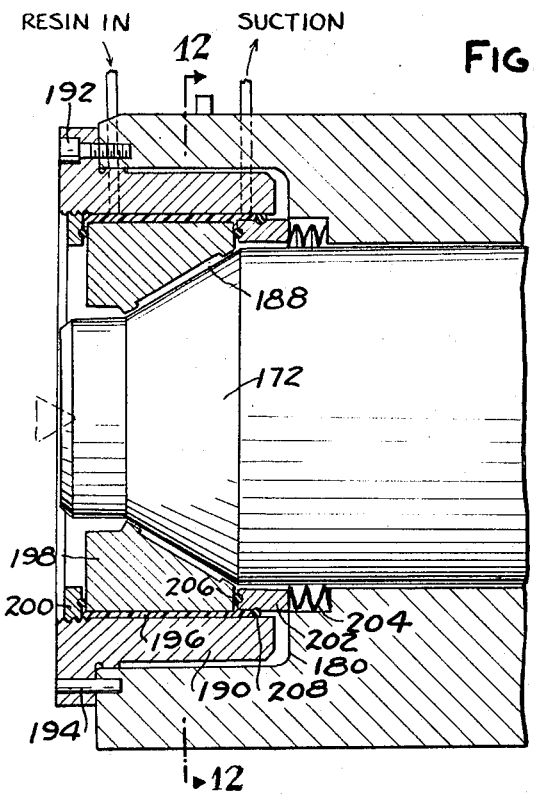
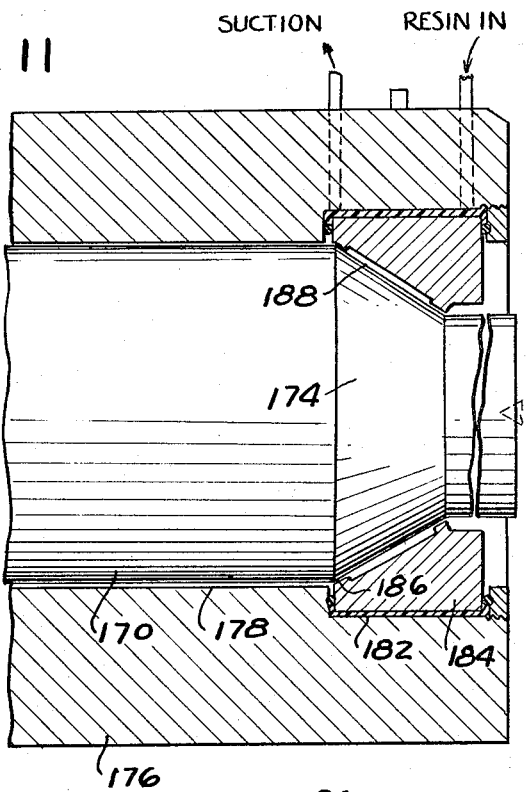
FIG. 11
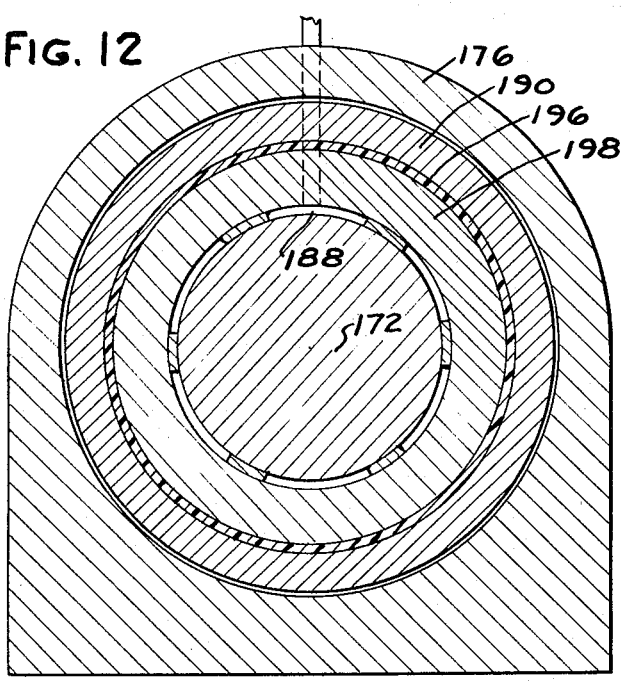
FIG. 12
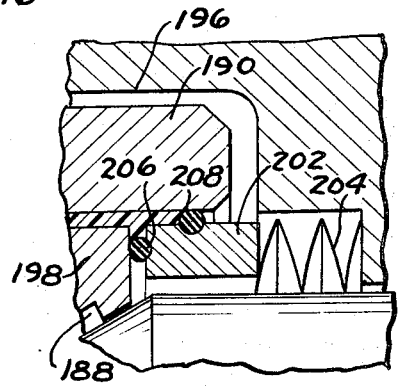
FIG. 13
INVENTOR.
JOHN K. RYE
BY
Barnes, Kisselle, Raisch & Choate
ATTORNEYS

United States Patent Office 3,359,613
Patented Dec. 26, 1967

3,359,613
HYDROSTATIC BEARING AND METHOD OF
MAKING SAME
John K. Rye, Beverly Hills, Mich., assignor to F. Jos.
Lamb Company, Inc., Detroit, Mich., a corporation of
Michigan
Filed May 27, 1965, Ser. No. 459,208
14 Claims. (Cl. 29—149.5)

ABSTRACT OF THE DISCLOSURE

A method of making hydrostatic bearings which involves the use of bearing pads having hydrostatic oil pockets therein. In practicing the invention the hydrostatic bearing pads are initially positioned in bearing contact with the juxtaposed bearing surface of the assembly and are rigidly located in such position by bonding them to a support by means of a fluid resin adapted to harden by setting. After the resin is set the desired clearance gap is formed between the bearing pad and the juxtaposed bearing surface such as by grinding one of the members of the assembly.

---

Hydrostatic bearings as defined herein comprise in combination a movable member, a support member on which the movable member is movable and a bearing pad on one of the members having an oil pocket therein into which oil is directed so that it may escape from the oil pocket and form a uniform film of oil between the bearing face on the bearing pad which peripherally surrounds the oil pocket and the bearing face of the other member. The manufacture of such hydrostatic bearings obviously requires machining tolerances of extremely close limits if the bearing is to function satisfactorily. The obtaining of such close limits poses practical problems in many applications. For example, if a spindle is to be supported at its opposite ends by means of a pair of hydrostatic bearings, it is not difficult to grind the shaft to a high degree of accuracy, but it is extremely difficult to bore the inner diameters of the two journal members coaxially to a high degree of accuracy. Likewise, in the case of a long slide on a machine tool, it is difficult to grind the gibs or ways on the supporting member so that the bearing surfaces on the slide and on the ways will be parallel to a high degree of accuracy throughout the length thereof.

It is accordingly an object of the present invention to provide a method of making hydrostatic bearings which eliminates the need for machining mating bearing parts to a very high degree of positional accuracy. For example, in the case of a rotating spindle or shaft the method of the present invention does not require the two axially spaced bearings for the shaft to be ground coaxially to extremely close tolerances.

More specifically, the invention has for its object the provision of a method of making a hydrostatic bearing assembly wherein the bearing pads are formed separately from the member on which they are mounted, and they are mounted on their respective supporting member by means of a hardenable resin which enables the bearing pads to be initially located in their proper positions and thereafter firmly retained in such positions by permitting the resin to set or harden.

A further object of the invention resides in a method of making hydrostatic bearings involving the use of a resin for locating the bearing pads on their respective supporting member in an accurately aligned position relative to the bearing surface on the other member.

In the drawings:

FIG. 1 is a sectional view showing a hydrostatic bearing assembly for a rotating spindle and the means for introducing resin into the assembly for the purpose of retaining the bearing pad in fixed position.

FIG. 2 is a sectional view taken along the line 2—2 in FIG. 1.

FIG. 3 is a sectional view of a machine tool slide embodying hydrostatic bearings of the present invention.

FIG. 4 is a sectional view along the line 4—4 in FIG. 3.

FIG. 5 is a sectional view along the line 5—5 in FIG. 3.

FIG. 6 is a sectional view on an enlarged scale of a portion of the arrangement shown in FIG. 3.

FIG. 7 is a sectional view of a further embodiment of a hydrostatic bearing assembly for a rotating shaft or spindle.

FIG. 8 is a sectional view along the line 8—8 in FIG. 7.

FIG. 9 is a sectional view of a further embodiment of hydrostatic bearing of the present invention, showing its application to a shaft that is designed to shift axially as well as rotate.

FIG. 10 is a sectional view along the line 10—10 in FIG. 9.

FIG. 11 is a sectional view of still another embodiment of hydrostatic bearing according to the present invention showing its application to a shaft having conically shaped bearing portions.

FIG. 12 is a sectional view along the line 12—12 in FIG. 11.

FIG. 13 is a sectional view on an enlarged scale of a portion of the arrangement shown in FIG. 11.

Referring to FIG. 1, the shaft or spindle 10 is journalled in a support member 12 by means of a hydrostatic bearing pad 14. Bearing pad 14 is in the form of a sleeve having a plurality of axially extending oil-receiving pockets 16 spaced circumferentially around the inner periphery thereof. The inner periphery 18 of sleeve 14 has a diameter slightly greater than the diameter of shaft 10. In use oil, preferably at constant volume, is introduced into each of the oil pockets 16 through a suitable metering orifice (not shown), so that the oil escapes in the clearance space 20 between the bearing surface 18 on sleeve 14 and the bearing surface 22 forming the outer cylindrical surface of shaft 10. In the drawing the clearance space 20 is shown highly exaggerated in thickness merely for the purpose of illustration. It will be understood that shaft 10 is supported by a similar hydrostatic bearing assembly at a portion thereof spaced axially from the portion shown.

In forming the hydrostatic bearing shown in FIGS. 1 and 2, the shaft 10 is originally dimensioned in diameter so that it has a very close fit with the inner peripheral surface 18 of sleeve 14. The support member 12 is formed with counterbores 24 at its opposite ends, the diameter of each counterbore being greater than the outer diameter of sleeve 14. Only one counterbore 24 is illustrated in FIG. 1, but the description will proceed on the understanding that the bearing assembly not illustrated is constructed and assembled in the same manner as the one illustrated. Sleeve 14 is slipped over shaft 10 and thereafter inserted in the support 12. The shaft may be supported on centers at its opposite ends as indicated at 26, so that the sleeve 14 will be generally concentric with the two counterbores 24. O-rings 28 are provided at each end of sleeve 14. One of the O-rings abuts against the inner shoulder 30 of counterbore 24 and the other O-ring 28 is abutted by an exteriorly threaded clamping ring 32 threaded into the open end of counterbore 24. O-rings 28 provide an effective seal for the clearance space 34 between sleeve 14 and the surfaces of the counterbore 24 which are spaced from the outer surfaces of sleeve 14.

The support member 12 has a pair of passageways 36, 38 extending from the exterior surface thereof to the clearance space 34. Passageway 36 is adapted to have a conduit 40 connected thereto in sealed relation. Conduit 40 extends to a source of plastic resin under pressure and has a valve 42 therein for controlling the flow of plastic through the conduit. Passageway 38 is adapted to have a transparent conduit 44 connected thereto in sealed relation. Conduit 44 extends to a vacuum pump and is also provided with a valve 46 therein for controlling the flow through the conduit.

After the clamping ring 32 is secured in place to effectively seal the clearance space between sleeve 14 and the adjacent surfaces of counterbore 24, the vacuum pump is operated with valve 46 open to evacuate the clearance space 34. When the desired vacuum is obtained valve 46 is closed and valve 42 is opened. The opening of valve 42 causes plastic resin under pressure to flow through conduit 40 and completely fill the clearance space 34 with resin. The complete filling of this clearance space is indicated when the resin is visible through the short portion 48 of conduit 44 between valve 46 and the passageway 38. After the clearance space 34 is completely filled with resin, the resin is caused to set. The resin employed may be either a thermoplastic resin or a thermosetting resin. In any event, the plastic used is selected such that when set it will hold the bearing pad sleeve 14 in fixed position within support member 12 and be capable of withstanding the load to which the shaft 10 is subjected.

Thereafter in order to obtain the proper clearance between the bearing face 18 of bearing pad 14 and the outer cylindrical surface of shaft 10, the shaft is withdrawn from within the support member 12 and the outer diameter thereof is uniformly reduced by grinding. O.D. grinding of a shaft in this manner to extremely close tolerances is a relatively simple procedure. The shaft 10 is then reinserted in the support member 12 and oil is fed to each of the pockets 16 from oil supply source, not shown, through conduits 50 and passageways 52 which are drilled through the support member 12 and the bearing pad 14 to register with the oil pockets 16. The oil is directed to the conduits 50 and passageways 52 through a suitable metering orifice at a constant rate so that the oil flow in each of the pockets 16 will be at a constant volume. This will maintain shaft 10 coaxial with bearing pad 14 in a manner well understood in this art.

The arrangement shown in FIGS. 3 through 6 illustrates the application of the invention to a machine tool slide which is designed to be shifted longitudinally of ways on a machine base. The machine base is designated 60 and has a pair of accurately machined ways 62, 64 fixedly mounted thereon. The machine slide is designated 66. Slide 66 has a plurality of bearing pads 68 mounted thereon for cooperation with the top faces of ways 62, 64. In addition, slide 66 is provided with a plurality of bearing pads 70 for cooperation with one side face of way 64 and another plurality of bearing pads 72 for cooperation with the opposite side face of way 64. The manner in which these bearing pads are mounted in the slide is best shown in FIG. 6.

At the location of each bearing pad, such as that illustrated at 68, the slide 66 is formed with a circular socket 74 which has a diameter greater than that of the bearing pad. A bore 76 is formed through the slide 66 concentric with socket 74 and communicates therewith by means of a counterbore 78. Within bore 76 there is arranged a sleeve 80 which is internally threaded as at 82 and which is formed at its lower end with a shouldered enlargement 84 that is received within the counterbore 78. An O-ring 86 on sleeve 80 seals with counterbore 78. Within sleeve 80 there is arranged a threaded plug 86 having an axial passageway extending therethrough. The upper end of the passageway comprises a threaded socket 88 and the lower end of the passageway also comprises a threaded socket 90. These two sockets are interconnected by a tube 92 having a small diameter passageway therethrough which provides an orifice of desired size. During assembly a plug is threaded into socket 88 and when in use a hydraulic line is connected to socket 88 for directing oil through tube 92 and into the oil pocket 94 of the hydrostatic pad 68. Pad 68 is connected to plug 86 by a screw 96 which has a central passageway 98 therein for directing oil from tube 92 into oil pocket 94. An O-ring 100 forms a sealed connection between plug 86 and the conical seat 102 in bearing pad 68.

In this arrangement each sleeve 80 may be rotated relative to plug 86, as by the lugs 104, to adjust the slide vertically while the pad 68 is resting directly on the way 62. A similar arrangement is provided for each of the bearing pads 68 on the top face of the other way 64. These sleeve assemblies can be adjusted with the hydrostatic pads resting directly on their respective ways or on a spacer shim disposed between the bearing pads and the top faces of the ways. In either event the spaced assemblies provide a means for adjusting the slide relative to the top faces of the two ways.

The bearing pads 70 and 72 are likewise provided with the described adjusting sleeve assembly to enable adjustment of the slide in a lateral direction relative to ways 64. In the case of bearing pads 70 and 72 the sleeve assembly is adjusted with shims of uniform thicknesses arranged between the bearing faces of the bearing pads and the upright side faces of ways 64.

After all of the bearing pads are adjusted as described, the clearance space 106 is evacuated in the manner described with respect to FIG. 1 through passageway 108, and after the desired vacuum is obtained the liquid resin is introduced into the clearance space through passageway 110. After the resin is caused to set each of the bearing pads is rigidly fixed in place relative to its associated bearing surface on the two ways 62, 64. Thereafter the shims are removed from between the bearing pads 70 and 72 and the vertical side faces of the way 64 to provide the desired clearance therebetween.

It will be observed from the showing in FIG. 3 that the bearing pads 70, and particularly the oil pockets therein, are smaller in size than the bearing pads 72 and the oil pockets therein. With this arrangement oil at constant volume is introduced to the oil pockets of the bearing pads 70 and oil at constant pressure is introduced into the larger oil pockets of the bearing pads 72. Thus the running gap between the bearing face of pads 70 and the associated upright side face of the way 64 will be maintained substantially constant regardless of any slight variation in the width of the way. Simultaneously oil at a constant rate of flow is introduced into the oil pockets 94 of the bearing pad 68 to support the slide on the thin film of oil escaping from pockets 94. In this manner the slide 66 will be guided both vertically and laterally in a uniform manner on the ways 62, 64. With the arrangement shown in FIGS. 3 through 6, it will be appreciated that no alignment or machining of the ways is required after the resin has set.

FIGS. 7 and 8 show the principle of the hydrostatic bearing assembly of the present invention as applied to a rotating shaft designed to sustain end thrust. The shaft, which is generally designated 112, is formed with a radial enlargement 114 at one location and at a point spaced axially from the enlargement 114 the shaft is fashioned with a seat 116 of lesser diameter to receive a ring 118 which is securely clamped in place by means of a nut 120. The bearing in this arrangement comprises a supporting body 122 fashioned with an axial bore 124 having counterbores 126, 128 at opposite ends thereof. Within counterbore 126 there is arranged a hydrostatic pad 130 in the form of an annular sleeve and within counterbore 128 there is arranged another hydrostatic pad 132 in the form of an annular sleeve. Each of these bearing pads is fixed in place by a resin layer 134 in the manner previously described. However, bearing pads 130 and 132 are formed with oil pockets 136 in the outer end faces thereof for cooperation with the inner faces of the radial enlargement 114 and the ring 118 on shaft 112. Thus, in this arrangement the oil passageways 138 connect with the oil pockets 136 as well as the oil pockets 140 around the inner periphery of the two bearing pads.

With this arrangement the necessary operating clearances between the bearing pads and the associated bearing surfaces on shaft 112 can be obtained in several ways. As is the case with the embodiment illustrated in FIGS. 1 and 2, these clearances may be obtained by removing the shaft from the bearing body after the resin has set and grinding the necessary clearances on the shaft. It will also be appreciated that the necessary operating clearances can be obtained by selecting the material of the bearing pads 130, 132 such that its coefficient of thermal expansion is higher than that of the shaft. The material of the bearing pads can be selected such that at a cool curing temperature of the resin the bearing pads will be reduced in diameter to fit the line-to-line contact with the shaft and at operating temperatures the correct clearance would exist. To obtain the necessary end clearance between the enlargement 114 and the ring 118, shims may be used when the bearing pads are initially set in position within the bearing body 122.

In the arrangement illustrated in FIGS. 9 and 10, shaft 140 includes a piston portion 142 which is adapted to reciprocate within a cylinder 144 in the bearing pad 146. Cylinder 144 is closed at one end by the shoulder 148 and at its opposite end by a second bearing pad 150. Bearing pads 146 and 150 are in the form of sleeves and are fixedly located within the outer supporting body 152 by a layer of hardened resin 154 as previously described. However, before the bearing pad 150 is assembled with bearing pad 146 and the body 152, it is dusted with a layer of parting compound, as shown at 156, so that after the resin has set it may be withdrawn from within body 152 to permit shaft 140 with its piston 142 to be withdrawn from the assembly and ground to provide the proper clearances between the shaft and the bearing pads. In order to assure proper, accurate realignment of bearing pad 150 after it is once removed from within the assembly, a dowel pin connection is preferably provided between bearing pads 146 and 150. These dowel pins are designated 158 in FIG. 10.

In bearing pad 146 there is formed an annular scavenging groove 160 which connects with a drain passageway 162 through which the oil flowing from the oil pockets 164 in the direction toward the piston cylinder 144 is adapted to drain. It will be observed that the two bearing pads 146, 150 are initially retained in the body 152 by nuts 166 at opposite ends of the body. The nut 166 adjacent the bearing pad 150 is adapted to be removed to permit withdrawal of bearing pad 150 and shaft 140 from the assembly. Although the oil passageways for all of the bearing pockets are not illustrated, it will be appreciated that suitable passageways and metering valves are provided for admitting oil at a constant rate of flow to each of the individual oil pockets.

The arrangement shown in FIGS. 11 through 13 show the adaptation of the hydrostatic bearing of the present invention to a shaft having conical bearing portions. The shaft is generally designated 170 and the spaced conical bearing portions thereon are designated 172 and 174. The support body, which is designated 176, has a central bore 178 provided with a counterbore 180 at one end and a second counterbore 182 at its opposite end. Within counterbore 182 there is arranged an annular bearing pad 184 having a conically shaped bearing surface 186 conforming to the bearing surface 174 of the shaft. The oil pockets in bearing pad 184 are designated 188. In the other counterbore 180 there is arranged an adaptor 190 which is secured to the body 176 by screws 192 and dowels 194. Adaptor 190 is in the form of a sleeve having an inner cylindrical bore 196. An annular bearing pad 198 is mounted within bore 196 by means of a layer of resin as previously described.

In initially assembling the bearing the two bearing pads 190 and 184 are inserted in their respective sockets and retained therein by means of the nuts 200. The initial endwise adjustment of the two bearing pads relative to the conical bearing surfaces 162, 174 on shaft 170 is assisted by a spacer ring 202 which is backed up by a plurality of spring washers 204. O-rings 206 and 208 around spacer 202 provide a sealed chamber for the resin. After the resin has set screws 192 may be loosened to permit withdrawal of adaptor 190 together with bearing pad 198 from within body 176. Thereafter the shaft may be withdrawn and either or both of the conical bearing surfaces 172, 174 may be ground to provide the necessary operating clearance between the shaft and the bearing pads.

In the bearing arrangements disclosed herein involving rotating shafts, it will be appreciated that after the necessary operating clearances are formed, as described, there will be a certain degree of looseness between the shafts and their respective bearing pads when oil is not being directed to the oil pockets in the bearing pads. Thus, in order to avoid damage to the bearing assembly, during shipment, for example, it is advisable to fixedly support the shafts so that they are out of contact with the bearing surfaces of the bearing pads until such time as the bearing assembly is used. A simple manner for protecting the bearing pads for such purpose is shown in FIG. 1, and is applicable in the other embodiments of the invention illustrated. The particular arrangement shown in FIG. 1 involves the use of a hardened steel ring 210 which is tightly fitted in a shouldered groove 212 in the bearing pad. Ring 210 also has a close fit with the associated shaft. Preferably such rings would be provided adjacent opposite ends of the bearing to eliminate the possibility of looseness between the shaft and the bearing pads during shipment of the assembly incorporating such a bearing. Prior to operation, the hardened steel rings 210 would be removed. In the case of a slide arrangement such as shown in FIGS. 3 through 6, the bearing faces can be protected during shipment of the machine by inserting shims between the bearing pads and the respective bearing surfaces of the two ways.

I claim:

1. The method of forming a hydrostatic bearing assembly adapted for supporting a movable member for highly accurate movement with respect to a bearing surface of a support member, said assembly including a bearing pad on one of said members having a fluid pocket in one face thereof which is peripherally surrounded by a bearing surface juxtaposed and closely conforming in contour to a bearing surface of the other member, said method comprising the steps of forming a recess in one of said members which is adapted to receive the bearing pad with a relatively loose fit, inserting the bearing pad within said recess and assembling the movable member with the support member so that the bearing surface on the bearing pad is accurately aligned and in bearing contact with the bearing surface on said other member, filling the portion of the recess not occupied by the bearing pad with a resinous material which when set is adapted to rigidly bond the bearing pad to said one member and locate the bearing pad in rigidly fixed position on said one member in alignment and bearing contact with the bearing surface on the other member, causing said resin to set, and thereafter forming a clearance gap of uniform width between the bearing surfaces of the bearing pad and said other member such that when oil under pressure is directed into said fluid pocket it is permitted to drain therefrom through said clearance gap and thereby provide a uniform film of oil between said last two mentioned bearing surfaces.

2. The method called for in claim 1, wherein the movable member comprises a shaft and the support member has a bore therein forming said recess, the bearing pad comprising a cylindrical sleeve within said bore.

3. The method called for in claim 2, wherein said clearance gap is formed by withdrawing the shaft from said bore and grinding the outer cylindrical surface thereof.

4. The method called for in claim 1, wherein the movable member comprises a slide and the support member includes a way on which the slide is guided for movement, the bearing pad being mounted in said slide and said bearing surfaces being flat.

5. The method called for in claim 4, wherein the slide is also movable on the way in a direction normal to said flat bearing surfaces and wherein said clearance gap is formed by directing oil into said fluid pocket at a sufficient pressure and rate to allow the oil to escape from the pocket between the flat bearing surfaces on the bearing pad and way.

6. The method called for in claim 1, including the step of evacuating the space between the bearing pad and the walls of said recess and filling said space with said resinous material while the space is at a negative pressure.

7. The method called for in claim 6, including the step of forming a peripheral seal between the bearing pad and the walls of said recess to facilitate evacuating said space.

8. The method of mounting a shaft for rotation about a highly accurate fixed axis within an elongated bore of a support member which comprises forming a pair of cylindrical sockets in the bore of the support member one adjacent each of the opposite ends thereof, inserting in each socket a sleeve member having an outer dimension sufficiently less than the inner diameter of the socket as to fit loosely therein, each sleeve having a plurality of oil pockets spaced circumferentially around the inner peripheral surface thereof and connected with the outer surface thereof by pasageways extending through both sleeves, forming a shaft having an outer diameter accurately conforming to the inner diameter of the sleeves, fixedly mounting the support member and the shaft relative to one another so that there is an annular space between the outer peripheral surface of each sleeve and the inner peripheral surface of each socket, filling each of said annular spaces, while the shaft and support member are held in said relatively fixed position, with a resinous material which when set is adapted to fixedly position each sleeve relative to the support so that the sleeves are axially aligned and concentric to the shaft to a high degree of accuracy, causing said resinous material to set, removing the shaft from within said sleeves, grinding the outer diameter of the shaft to a dimension slightly less than the inner diameter of the sleeve, extending the ground shaft through the sleeves and thereafter directing oil under pressure to said oil pockets through said passageways in an amount and at a pressure sufficient to cause the oil to drain therefrom through the clearance space between the shaft and the inner diameter of the sleeves to thereby provide a film of oil between the shaft and the inner periphery of each sleeve capable of supporting the shaft.

9. The method called for in claim 8, including the step of evacuating the spaces between the inner peripheral surface of the sockets and the outer peripheral surface of the sleeves and filling said spaces with said resin while said spaces are at a negative pressure.

10. The method called for in claim 8, including the steps of sealing each of said spaces adjacent opposite ends of each sleeve, evacuating each of said spaces and filling said spaces with said resinous material while the spaces are in an evacuated condition.

11. The method of mounting a shaft for rotation about a highly accurate fixed axis within an elongated bore of a support member which comprises forming a pair of sockets in the bore of the support member adjacent the opposite ends thereof, inserting in each socket a sleeve having an outer dimension sufficiently smaller than the cross dimension of the socket so as to fit loosely therein, each sleeve having an inner peripheral bearing surface provided with a plurality of oil pockets spaced circumferentially therearound and connected with the outer surface thereof by passageways extending through the sleeves, forming a shaft having axially spaced circumferentially-extending bearing surfaces sized to accurately fit with the bearing surfaces of said sleeve, fixedly mounting the support member and the shaft relative to one another so that the bearing surfaces on the sleeves are in bearing contact with the bearing surfaces on the shaft and so that there is an annular space between the outer peripheral surface of each sleeve and the surface of each socket, filling each of said annular spaces, while the shaft, the sleeves and the support member are held in said relatively fixed position, with a resinous material which when set is adapted to rigidly bond each sleeve in the bore of said support member and locate said sleeves in rigidly fixed positions on said support member with the bearing surfaces thereof in alignment and bearing contact with the bearing surfaces on the shaft, causing said resin to set, and thereafter forming an annular clearance gap of uniform width between the bearing surfaces on said sleeves and said shaft such that when oil under pressure is directed into said fluid pockets it is permitted to drain therefrom through said clearance gap and thereby provide a uniform film of oil between the bearing surfaces on said sleeves and shaft.

12. The method called for in claim 11 wherein said bearing surfaces are frusto-conically shaped and concentric with the longitudinal axis of said shaft.

13. The combination called for in claim 12 wherein an annular insert is inserted axially into one of said sockets and one of said sleeves is bonded by said resin within said annular insert, said insert being capable of being axially withdrawn from within its socket to permit withdrawal of the shaft from within the bore of said support member.

14. The method called for in claim 13 wherein said clearance gap is formed by withdrawing said insert from its socket, withdrawing the shaft from within said bore, removing a uniform layer of stock from at least one of the bearing surfaces and thereafter re-assembling the shaft and the insert member within the bore of the support member.

References Cited
UNITED STATES PATENTS

| | | | |
|---|---|---|---|
| 2,578,711 | 12/1951 | Martellotti | 308—122 |
| 3,034,837 | 5/1962 | Barker | 308—9 |
| 3,126,613 | 3/1964 | Litsky | 29—149.5 |

THOMAS H. EAGER, *Primary Examiner.*